United States Patent
Novoselov

(10) Patent No.: US 7,952,486 B2
(45) Date of Patent: May 31, 2011

(54) LIQUID CRYSTAL DISPLAY DEVICE PROVIDED WITH A GAS DETECTOR, GAS DETECTOR AND METHOD FOR MANUFACTURING A GAS DETECTOR

(75) Inventor: Pavel Novoselov, Heerlen (NL)

(73) Assignee: Chimei Innolux Corporation, Miao-Li County (TW)

( * ) Notice: Subject to any disclaimer, the term of this patent is extended or adjusted under 35 U.S.C. 154(b) by 847 days.

(21) Appl. No.: 11/832,945

(22) Filed: Aug. 2, 2007

(65) Prior Publication Data

US 2009/0033509 A1 Feb. 5, 2009

(51) Int. Cl.
*G08B 21/00* (2006.01)
(52) U.S. Cl. ............. 340/632; 340/628; 340/629; 345/4
(58) Field of Classification Search .................. 340/632, 340/628, 629; 349/1, 187; 345/4; 73/23
See application file for complete search history.

(56) References Cited

U.S. PATENT DOCUMENTS

| | | | | |
|---|---|---|---|---|
| 4,207,558 A * | 6/1980 | Kunzer | ......................... | 340/524 |
| 4,706,493 A * | 11/1987 | Chang et al. | ................. | 73/31.06 |
| 5,061,447 A * | 10/1991 | Ono | ................................. | 422/96 |
| 5,596,219 A * | 1/1997 | Hierold | ......................... | 257/467 |
| 2005/0210672 A1* | 9/2005 | Reynolds et al. | ................ | 29/830 |
| 2006/0076944 A1* | 4/2006 | Weikel et al. | ..................... | 324/74 |
| 2006/0164241 A1* | 7/2006 | Makela et al. | ................ | 340/556 |
| 2006/0196248 A1* | 9/2006 | Nakano et al. | ................ | 73/31.06 |
| 2006/0223547 A1* | 10/2006 | Chin et al. | .................. | 455/456.1 |
| 2007/0005267 A1* | 1/2007 | Li | ..................................... | 702/24 |
| 2007/0035473 A1* | 2/2007 | Yamazaki et al. | ................. | 345/4 |
| 2007/0069905 A1* | 3/2007 | Wang | ............................ | 340/632 |
| 2007/0146155 A1* | 6/2007 | Moon et al. | ................. | 340/691.6 |
| 2007/0164859 A1* | 7/2007 | Cobianu et al. | .......... | 340/539.26 |
| 2008/0054382 A1* | 3/2008 | Stetter | ............................ | 257/414 |
| 2008/0121946 A1* | 5/2008 | Youn et al. | ..................... | 257/253 |

* cited by examiner

*Primary Examiner* — George A Bugg
*Assistant Examiner* — Hoi C Lau
(74) *Attorney, Agent, or Firm* — Tim Tingkang Xia; Morris, Manning & Martin, LLP

(57) ABSTRACT

A liquid crystal display device with a substrate and a gas detector. The substrate has a pixel array area and an electrical connection area. The pixel array area has a plurality of pixels. The electrical connection area has a plurality of bond pads positioned on the surface of the substrate to address the plurality of pixels in the pixel array area. The gas detector is positioned within the electrical connection area. The gas detector is arranged to detect the presence of a specified gas.

7 Claims, 3 Drawing Sheets ations, e.g. mobile telephones, personal digital assistants (PDA's), navigation tools etc. While on the move, a user of a mobile application may enter an area with a dangerous concentration of a hazardous gas, e.g. carbon monoxide. Carbon monoxide (CO) is a colorless and odorless gas. Its affinity to bind to hemoglobin far exceeds the binding affinity of oxygen. Consequently, exposure to CO reduces the oxygen carrying capacity of blood. Low level exposure can cause flu-like symptoms, while higher level exposure may cause severe headaches and fainting. Higher level exposure over a considerable amount of time can be lethal.

LIQUID CRYSTAL DISPLAY DEVICE PROVIDED WITH A GAS DETECTOR, GAS DETECTOR AND METHOD FOR MANUFACTURING A GAS DETECTOR

BACKGROUND OF THE INVENTION

1. Field of the Invention

The present invention generally relates to a liquid crystal display (LCD) device provided with a gas detector, a gas detector for use in such a liquid crystal display device, and a method for manufacturing such a gas detector.

2. Description of Related Art

LCD-displays are known in the art. An LCD-display has a number of pixel elements, usually arranged in a matrix formation, wherein each pixel element may be controlled individually to emit light. By selectively controlling each pixel, an image may be created.

The LCD-display may be formed by a stack of layers, which will be explained in more detail below with reference to FIG. 1. One of these layers contains liquid crystal molecules forming a liquid crystal element which may be controlled by electrode layers, e.g. an Indium Tin Oxide layer (ITO-layer), arranged to address specific regions (pixels) of the liquid crystal element by applying a voltage to these specific regions.

By controlling the application of a voltage, the orientation of the molecules of the liquid crystal may be controlled in such a way that the liquid crystal element is either in an opaque state, in a transparent state or in some defined semi-transparent state in between. The transmission properties of the stack of layers may be controlled spatially by means of a grid of electrodes. By applying a voltage on one or more electrodes within the grid of electrodes, the transmissivity of pixels is addressed.

The liquid crystal element and the electrode layers are positioned between two polarizing filters. Light traveling through the stack of layers may be blocked or transmitted depending on the orientation of the liquid crystal molecules and the orientation of the polarizing filters.

In order to create a color LCD-display, each pixel may be divided into sub-pixels that may be individually addressed, each sub-pixel having its own liquid crystal element. Each pixel may be divided according to a red, green, blue (RGB) arrangement, i.e. each pixel may be divided into at least a red, a green and a blue sub-pixel, as known to a person skilled in the art. The colors are added to the arrangement by adding a separate color filter layer, for example, between the polarizing layers. The color filter layer may be a matrix of adjacent color filters.

LCD-displays are currently used in numerous mobile applications, e.g. mobile telephones, personal digital assistants (PDA's), navigation tools etc. While on the move, a user of a mobile application may enter an area with a dangerous concentration of a hazardous gas, e.g. carbon monoxide. Carbon monoxide (CO) is a colorless and odorless gas. Its affinity to bind to hemoglobin far exceeds the binding affinity of oxygen. Consequently, exposure to CO reduces the oxygen carrying capacity of blood. Low level exposure can cause flu-like symptoms, while higher level exposure may cause severe headaches and fainting. Higher level exposure over a considerable amount of time can be lethal.

With the continual increase of mobile communication and an increase in locations where people go for work, recreation etc., there is a need to reduce the risk of encountering an environment where dangerous concentrations of one or more hazardous gases are present.

BRIEF SUMMARY OF THE INVENTION

In an exemplary embodiment, there is provided an LCD-display device with a substrate with a pixel array area, the pixel array area having a plurality of pixels, and an electrical connection area, the electrical connection area including a plurality of bond pads positioned on the surface of the substrate to address the plurality of pixels in the pixel array area. A transparent plate is arranged to cover the plurality of pixels in the pixel area. A gas detector, positioned within the electrical connection area is arranged to detect the presence of a specified gas.

In another embodiment, the invention further relates to a gas detector for use in a liquid crystal display device with an insulating substrate forming a surface. A first contact layer provided on the surface is arranged to provide a first electrical contact. A second contact layer is arranged to provide a second electrical contact. A third contact layer is arranged to provide a third electrical contact. A dielectric layer is arranged to electrically insulate the first contact layer from the second and third contact layers. A sensing layer of poly-silicon, positioned between the second and third contact layer and separately in contact with a least part of their circumferences, is arranged to detect gas particles. Further, the sensing layer has a surface side which is at least partly exposable to gas particles.

In another embodiment, the invention further relates to a method of manufacturing a gas detector, including: providing an LCD-display device, the LCD-display device with a substrate, the substrate with a pixel array area which has a plurality of pixels and an electrical connection area including a plurality of bond pads positioned on the surface of the substrate to address the plurality of pixels in the pixel array area; depositing on an insulating surface within the electrical connection area a first contact layer arranged to provide a first electrical contact, the first contact layer being provided on the insulating surface, a dielectric layer on the first contact layer and a sensing layer of poly-silicon arranged to detect gas particles on the dielectric layer; patterning the sensing layer into a patterned sensing layer; providing a second and a third contact layer, the second contact layer being arranged to provide a second electrical contact to the patterned sensing layer, and the third contact layer arranged to provide a third electrical contact to the patterned sensing layer; depositing a passivation layer over the second and third contact layers and the patterned sensing layer; and patterning the passivation layer to create an opening over the patterned sensing layer such that a gas exposure region is formed.

The foregoing, as well as additional objects, features and advantages of the invention will be more readily apparent from the following detailed description, which proceeds with reference to the accompanying drawings.

BRIEF DESCRIPTION OF THE DRAWINGS

The present invention will be discussed in more detail below, using a number of exemplary embodiments, with reference to the attached drawings, in which.

DETAILED DESCRIPTION OF THE INVENTION

Figure 1:
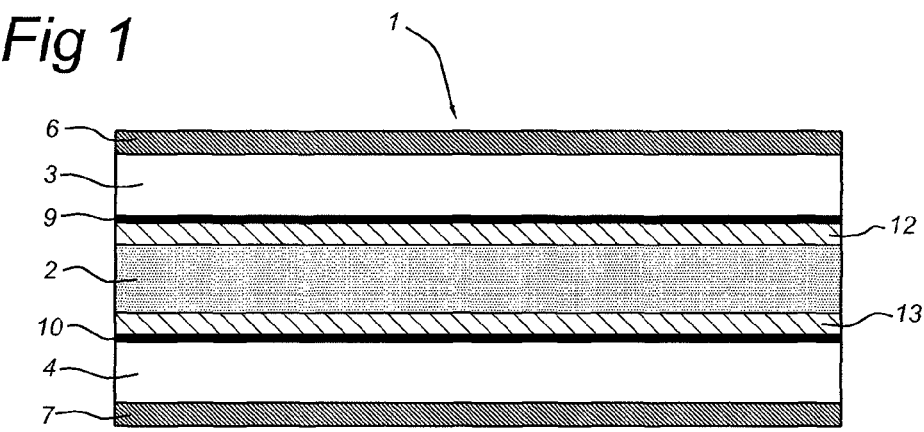
FIG. 1 schematically depicts a cross-sectional view of a typical LCD-display.

FIG. 1 schematically depicts a cross-sectional view of a typical LCD-display 1. The LCD-display 1 includes a layer of liquid crystals 2 sandwiched between two glass plates 3, 4, positioned substantially parallel with respect to each other. Both glass plates 3, 4 include a polarizer filter, i.e. polarizer filter 6 and 7, respectively, at the surface facing away from the layer of liquid crystals 2. The polarizing directions of the polarizer filters 6, 7 may be oriented in different ways with respect to each other. Typically, the polarizing direction of the polarizer filters 6, 7 are either substantially parallel or substantially perpendicular with respect to each other, depending on the kind of LCD-display.

At the surface of each glass plate 3, 4 facing the layer of liquid crystals 2, a barrier layer 9, 10, e.g. a $SiO_2$ layer, is provided to separate the glass plates 3, 4 from further material inside the LCD-display 1.

On top of the surface of the barrier layers 9, 10 facing the layer of liquid crystals 2, electrode layers 12, 13, e.g. made of Indium Tin Oxide (ITO), may be formed. The electrode layers 12, 13 form electrodes, which may be used to address (sub-) pixels and to provide a desired voltage to these (sub-)pixels.

The LCD-display 1 may further include poly-imide layers (not shown) between the electrode layer 12, 13 and the layer of liquid crystals 2. The poly-imide layers are used to align liquid crystal molecules present in the layer of liquid crystals 2 in a specified direction. This alignment is achieved by applying a rubbing treatment to the poly-imide layers, e.g. by rubbing a cloth of a thin polymer in the specified direction. The direction of alignment of the liquid crystal molecules is related to the direction of rubbing.

An LCD-display 1 may either be a passive matrix LCD-display or an active matrix LCD-display. Examples of passive matrix LCD-displays include displays using a super twist nematic (STN) or double-layer STN (DSTN) technology and are used in small monochrome displays such as those found in personal organizers. Examples of active matrix LCD-displays include thin film transistors (TFT), low temperature polycrystalline silicon (LTPS) displays and thin film diodes (TFD). These displays are used in present day computer monitors and televisions, as well as in color displays in mobile phones.

Figure 2A:
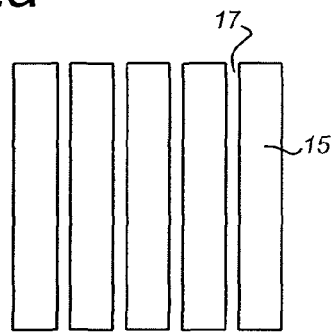
FIGS. 2a, 2b and 2c schematically depict a top view of electrode layers in a typical passive matrix LCD-display.
Figure 2B:
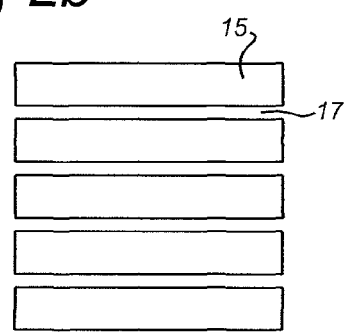
Figure 2C:
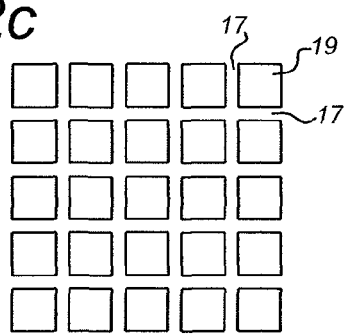

In a passive matrix LCD-display, the electrode layers 12, 13 enclosing the layer of liquid crystals 2 include a different pattern of electrodes as is schematically shown in FIGS. 2a-c. The electrode layers 12, 13 may be used to apply a voltage to the entire passive LCD-display. Cells are separated by a gap in the electrode layers 12, 13.

In each electrode layer, a plurality of substantially parallel electrodes 15 is provided. In one layer of the electrode layers 12, 13, schematically depicted in FIG. 2a, the electrodes 15 are strips with an orientation in a first direction, i.e. in a vertical direction. In the other layer of the electrode layers 12, 13, schematically depicted in FIG. 2b, the electrodes 15 are strips with an orientation in a second direction, i.e. a horizontal direction. Generally, the orientation of the electrodes 15 in the electrode layers 12, 13 with respect to each other is as shown in FIGS. 2a, 2b, i.e. the second direction is substantially perpendicular to the first direction. The electrodes 15 in the electrode layers 12, 13 are separated from each other by gaps 17.

When positioned on top of each other while enclosing the layer of liquid crystals 2, the electrodes 15 may be used to address a single selected pixel 19 (see FIG. 2c) within an array including a plurality of pixels.

In an active matrix LCD-display, however, pixels may be controlled individually in a different way. In an active matrix LCD-display, the electrode layers 12, 13 are generally provided with a plurality of thin-film transistors (TFT's), generally positioned in a matrix-format with respect to each other. The TFT's are capable of holding a charge for a limited period of time. Because a transistor has switching capabilities, only the desired pixel may receive the charge. As a result, a TFT is capable of storing an electrical state of a pixel on the display while all other pixels are being updated. Consequently, the image quality of an active matrix LCD-display is generally better than the image quality of a passive matrix LCD-display.

Figure 3:
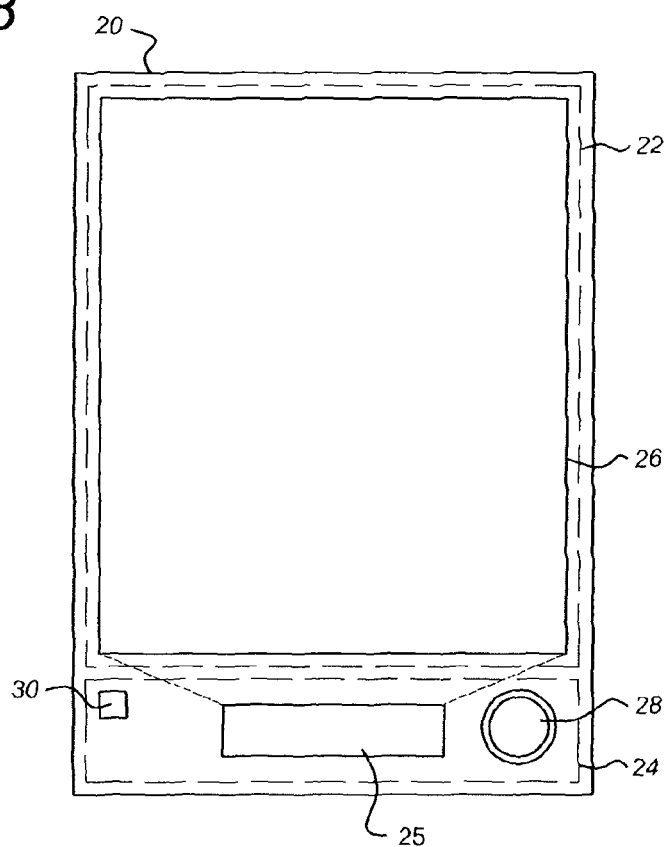
FIG. 3 schematically depicts a front view of a liquid crystal display according to an embodiment of the present invention.

FIG. 3 schematically depicts a front view of a liquid crystal display 20 according to an embodiment of the present invention. The liquid crystal display 20 has two areas, i.e. a pixel array area 22 and an electrical connection area 24. The pixel array area 22 is the area in which the plurality of pixels 19 is located, the pixels 19 being formed in a way as described with reference to FIGS. 1 and 2. The electrical connection area 24 is also referred to as a contact ledge due to the presence of one or more electrical connectors 25. In the electrical connection area 24 a plurality of bond pads is provided. The plurality of bond pads, when controlled by some kind of control system (not shown), enable the application of suitable voltages to specified pixels of the plurality of pixels 19. In order to protect the plurality of pixels 19, a transparent plate 26, e.g. made of glass, may be arranged to cover the pixel array area 22.

In the electrical connection area 24, space is reserved for a gas detector 28. The gas detector 28 as positioned within the electrical connection area 24 is arranged to detect the presence of a specified gas, e.g. a hazardous gas like carbon monoxide. The gas detector 28 is integrated with other elements within the electrical connection area 24, i.e. it is built by using a similar manufacturing technology.

In order to warn the user of the liquid crystal display 20 that a dangerous concentration of a hazardous gas is present in the surroundings, the gas detector 28 may be arranged to communicate a warning signal towards an alarm unit 30. Examples of an alarm unit include an alarm light, e.g. a light emitting diode, and an alarm sound generating unit. In the embodiment depicted in FIG. 4, the alarm unit 30 is positioned in the electrical connection area 24. It must be understood that such an alarm unit 30 could also be positioned at other locations of the liquid crystal display 20 as will be understood by a person skilled in the art.

In embodiments of the present invention, the gas detector 28, depicted in FIG. 3, is manufactured using Low Temperature Poly-crystalline Silicon (LTPS) technology. Gas detectors that can be made using LTPS technology include resistive bridge type gas detectors, capacitive bridge type gas detectors, complementary metal-oxide-semiconductor (CMOS) gas detectors and gated metal-oxide semiconductor (MOS) gas detectors.

Figure 4:
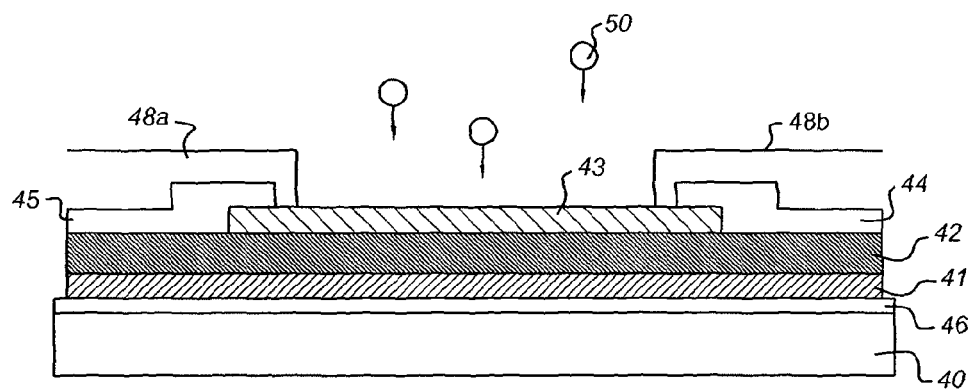
FIG. 4 depicts a cross section of a gas detector manufactured with low temperature polycrystalline silicon (LTPS) technology according to an embodiment of the invention.

FIG. 4 depicts a cross section of a gas detector 28 manufactured in LTPS technology according to an embodiment of the invention. In this embodiment, a metal-oxide semiconductor transistor is integrated in the gas detector, forming a MOS gas detector. The gas detector 28 includes an insulating substrate 40. On top of the insulating substrate 40, a first contact layer 41 is provided. The first contact layer 41 is an electrically conductive layer. Suitable materials for the first contact layer 41 include Aluminum (Al) and Copper (Cu).

Between the first contact layer 41 and the insulating substrate 40, a buffer layer 46 may be provided. The buffer layer serves as an insulation surface which is used as a fundament for transistors, e.g. in Silicon on Insulator (SoI) technology.

At the surface side of the first contact layer 41 facing away from the insulating substrate 40, a dielectric layer 42 is provided which at least partly covers the first contact layer 41. The dielectric layer 42 may be made of silicon nitride (SiN) as this material has suitable insulation properties and provides a suitable permittivity.

At the other side of the dielectric layer 42, three layer structures are provided. First, a sensing layer 43 is provided. Further, adjacent to the sensing layer 43, a second contact layer 44 and a third contact layer 45 are provided. The second contact layer 44 and the third contact layer 45 are arranged not to be directly connected. In order to ensure that a contact between the second contact layer 44 and the sensing layer 43 is established, it is advantageous to arrange partial coverage of the sensing layer 43 by the second contact layer 44, a situation which is depicted in FIG. 4. The same holds for the contact between the third contact layer 45 and the sensing layer 43. Finally, a passivation layer 48a may be provided which covers the second contact layer 44, and similarly, a passivation layer 48b may be provided which covers the third contact layer 45. The passivation layers 48a, 48b ensure protection from external influences. As can be seen in FIG. 4, part of the surface of the sensing layer 43 facing away from the insulating substrate 40 is not protected, and therefore is exposable to gas particles 50.

The first contact layer 41 may be arranged to serve as a gate layer in a MOS-transistor. The second and third contact layers 44, 45 may be arranged to serve as a source layer and a drain layer of a MOS-transistor respectively. Of course, due to the symmetry shown in FIG. 4, the second and third contact layers 44, 45 may also be arranged to serve as a drain layer and source layer of a MOS-transistor respectively, as will be understood by a person skilled in the art.

The sensing layer 43 may be arranged to serve as a channel between the second and third contact layers 44, 45. The current that may run through this channel depends on the type and/or concentration of incident gas particles 50.

Figure 5:
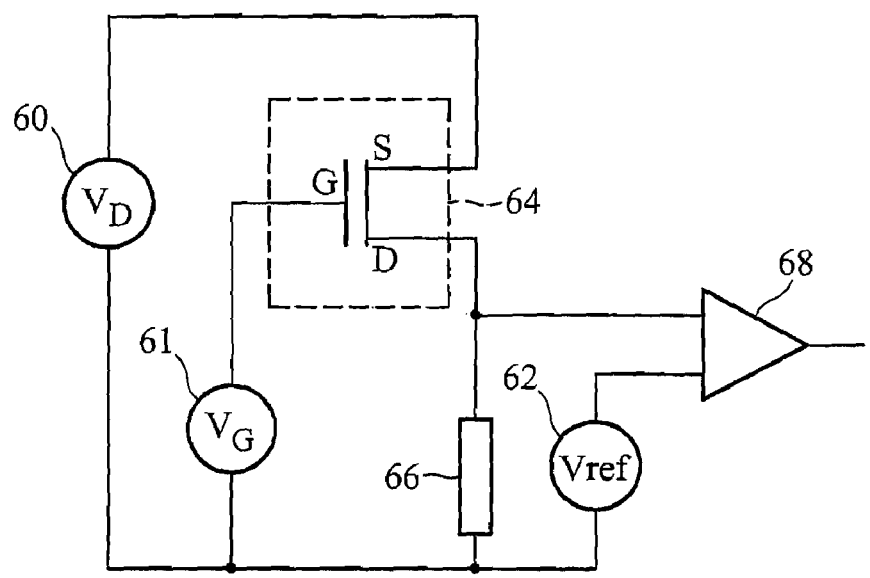
FIG. 5 schematically shows an electrical circuit that can be used in embodiments of the present invention.

FIG. 5 schematically shows an electrical circuit that may be used in embodiments of the present invention. In this circuit, three voltage sources 60, 61, 62 are provided. The gas detector in this circuit has the functionality of a MOS-transistor 64, and is depicted referred to as such. The MOS-transistor 64 includes a source S, a drain D, and a gate G as is known to a person skilled in the art.

A voltage source 60 is arranged to apply a suitable drain voltage $V_D$. Another voltage source 61 is arranged to apply a suitable gate voltage $V_G$ to the MOS-transistor 64. In operation together, the voltage sources 60, 61 form a suitable bias current, also referred to in literature as $I_{DS}$, i.e. the current between drain D and source S of MOS-transistor 64. The bias current $I_{DS}$ is converted to a voltage by a resistor 66.

In the case the MOS transistor 64 is constructed as schematically depicted in FIG. 4, the second contact layer 44 and third contact layer 45 (or vice versa) serve as source and drain respectively, while the first contact layer 41 serves as a gate. The bias current $I_{DS}$, i.e. the current in the channel between the second contact layer 44 and the third contract layer 45, now depends on the voltage provided at the first contact layer 41, i.e. the gate voltage, and the amount of gas particles falling on the gas sensitive region, i.e. the sensing layer 43.

The circuit further includes a comparator 68. The comparator 68 is arranged to compare the voltage over the resistor 66 and a reference voltage $V_{ref}$, provided by voltage source 62, when the latter is in operation. The output of the comparator 68 is used as a measure for the presence of a dangerous concentration of a hazardous gas in the surroundings, e.g. a high output may indicate that the measured concentration is too high and a low output that the measured concentration is at an acceptable level.

The value of the bias current $I_{DS}$ changes upon reception of specific gas particles 50. The amount of change may depend on the type or concentration of the specific gas that is detected, or both.

When the change of bias current $I_{DS}$ induces a voltage over the resistor 66 that exceeds the reference voltage $V_{ref}$ provided by voltage source 62, the output of the comparator 68 changes, e.g. the output of the comparator 68 changes from low to high. The output of the comparator 68 may be fed to an alarm unit, e.g. the alarm unit 30 shown in FIG. 3.

Alternatively, the circuit may include a number of comparators, each comparator arranged to compare the voltage over the resistor 66 with a different reference voltage in order to obtain a digital level output of the detected gas level.

Of course, many other circuit implementations can be used. For example, resistive bridge type gas detectors, capacitive bridge type gas detectors, and gated metal-oxide gas detectors may be integrated in the electrical connection area of a liquid crystal detection device and may use a detection mechanism that differs from the one depicted in FIGS. 4 and 5.

It must be understood that a gas detector integrated on a liquid crystal display device can be connected via any type of connection with an external processing unit, e.g. a central processing unit (CPU). For example, if the liquid crystal device is integrated in a mobile unit, e.g. a mobile phone or a personal digital assistant, with an antenna, the gas detector may send a digital code, e.g. the output received from a series of comparators as explained with reference to FIG. 5, via the antenna towards the external CPU. The CPU may then, upon reception of the digital code, calculate the concentration of the gas detected. Depending on the concentration as calculated, the external CPU may induce further actions, e.g. sending an SOS signal via a cellular or any other radio network or initiating a local alarm signal.

Alternatively, instead of an external CPU, an internal CPU may be used, i.e. a processor present in the liquid crystal display device. In an embodiment, the internal CPU is integrated in the liquid crystal display device made by using LTPS technology.

Figure 6:
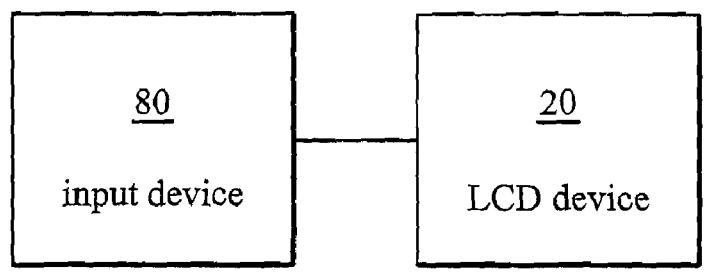
FIG. 6 schematically shows an electronic device employing the display device.

FIG. 6 schematically shows an electronic device 70 employing the liquid crystal display device 20. The electronic device 70 may be, but not limited to, a mobile phone, a digital camera, a PDA (personal data assistant), a notebook computer, a desktop computer, a television, a GPS (Global Positioning System), an automotive display, an avionics display, a digital photo frame or a portable DVD player, for example. Generally, the electronic device 70 includes an input unit 80 and the liquid crystal display device 20 shown in FIG. 3, etc. Further, the input unit 80 is in communication or operatively coupled to the liquid crystal display device 20 and provides input signals (e.g., image signal) to the liquid crystal display device 20.

Embodiments of the gas detector as discussed above, may be manufactured by using the following method of manufacturing. First, a liquid crystal display device is provided. The liquid crystal display device may be manufactured with LTPS-technology. The liquid crystal display device includes a substrate which includes a pixel array area and a electrical connection area. The pixel array area has a plurality of pixels. The electrical connection area includes a plurality of bond pads positioned on the surface of the substrate to address the plurality of pixels in the pixel array area.

Subsequently, on an insulating surface within the electrical connection area, the following layers are deposited. First, a first contact layer arranged to provide a first electrical contact is provided on the insulating surface. Secondly, a dielectric layer is deposited on the first contact layer. Finally, a sensing layer of poly-silicon is deposited on the dielectric layer. The sensing layer is arranged to detect gas particles as discussed in more detail earlier.

The method of manufacturing a gas detector continues by patterning the sensing layer into a patterned sensing layer.

Subsequently, a second contact layer and a third contact layer are provided. The second contact layer is arranged to provide a second electrical contact to the patterned sensing layer. The third contact layer is arranged to provide a third electrical contact to the patterned sensing layer. Providing the second and third contact layer may involve depositing a further contact layer over the dielectric layer and the patterned sensing layer followed by patterning the further contact layer into the second contact layer and the third contact layer.

After providing the second contact layer and the third contact layer, a passivation layer is deposited over the second contact layer and the third contact layer, as well as over the patterned sensing layer.

Finally, the patterning layer is patterned to create an opening over the patterned sensing layer such that a gas exposure region is formed.

The present invention has been explained above with reference to a number of exemplary embodiments. As will be apparent to the person skilled in the art, various modifications and amendments can be made without departing from the scope of the present invention, as defined in the appended claims.

The invention claimed is:

1. A gas detector for use in a liquid crystal display device comprising:
   an insulating substrate comprising a surface;
   a first contact layer arranged to provide a first electrical contact, said first contact layer being provided on said surface;
   a second contact layer arranged to provide a second electrical contact;
   a third contact layer arranged to provide a third electrical contact;
   a dielectric layer arranged to electrically insulate said first contact layer from said second and third contact layers; and
   a sensing layer of poly-silicon partially covered by said second and third contact layers and a portion of said sensing layer of poly-silicon is exposed to a surrounding to detect gas particles therein.

2. The gas detector according to claim 1, wherein said gas detector further comprises a buffer layer provided between said first contact layer and said surface of the insulating substrate.

3. The gas detector according to claim 1, wherein said first contact layer is arranged to serve as a gate layer, said second contact layer is arranged to serve as a source layer, and said third contact layer is arranged to serve as a drain layer.

4. The gas detector according to claim 1, wherein said insulating layer comprises silicon nitride (SiN).

5. A method of manufacturing a gas detector comprising:
   providing a liquid crystal display device, the liquid crystal display device including a substrate, said substrate comprising:
   pixel array area which has a plurality of pixels; and
   an electrical connection area to address said plurality of pixels in said pixel array area;
   providing an insulating surface within said electrical connection area comprising:
   a first contact layer arranged to provide a first electrical contact, said first contact layer being provided on said insulating surface;
   a dielectric layer on said first contact layer; and
   a sensing layer of poly-silicon arranged to detect gas particles on said dielectric layer;
   patterning said sensing layer into a patterned sensing layer;
   providing a second and a third contact layer, said second contact layer being arranged to provide a second electrical contact to said patterned sensing layer, and said third contact layer arranged to provide a third electrical contact to said patterned sensing layer;
   providing a passivation layer over said second and third contact layers and said patterned sensing layer; and
   patterning said passivation layer to create an opening over said patterned sensing layer such that a gas exposure region is formed.

6. The method according to claim 5, wherein said providing a second and a third contact layer comprises:
   depositing a further contact layer over said dielectric layer and said patterned sensing layer; and
   patterning said further contact layer into said second and said third contact layer.

7. The method according to claim 5, wherein said liquid crystal display device is manufactured with low temperature polycrystalline silicon technology.

* * * * *